(12) United States Patent
Whiter et al.

(10) Patent No.: US 10,752,739 B2
(45) Date of Patent: Aug. 25, 2020

(54) PARTICULATE CURING COMPONENTS

(71) Applicants: HEXCEL COMPOSITES LIMITED, Duxford, Cambridgeshire (GB); HEXCEL COMPOSITES GMBH & CO KG, Neumarkt (AT)

(72) Inventors: Mark Whiter, Saffron Walden (GB); Thorsten Ganglberger, Freistadt (AT); Michael Reisinger, Neumarkt (AT)

(73) Assignees: HEXCEL COMPOSITES LIMITED, Duxford (GB); HEXCEL COMPOSITES GMBH & CO KG, Neumarkt (AT)

( * ) Notice: Subject to any disclaimer, the term of this patent is extended or adjusted under 35 U.S.C. 154(b) by 27 days.

(21) Appl. No.: 16/312,451

(22) PCT Filed: May 26, 2017

(86) PCT No.: PCT/EP2017/062781
§ 371 (c)(1),
(2) Date: Dec. 21, 2018

(87) PCT Pub. No.: WO2018/001655
PCT Pub. Date: Jan. 4, 2018

(65) Prior Publication Data
US 2019/0144615 A1    May 16, 2019

(30) Foreign Application Priority Data

Jun. 27, 2016  (EP) .................................... 16176461

(51) Int. Cl.
| | | |
|---|---|---|
| *C08K 9/00* | (2006.01) | |
| *C08J 3/21* | (2006.01) | |
| *C08J 3/24* | (2006.01) | |
| *C08J 3/22* | (2006.01) | |
| *C08G 59/40* | (2006.01) | |
| *C08K 9/04* | (2006.01) | |

(52) U.S. Cl.
CPC .......... *C08J 3/212* (2013.01); *C08G 59/4021* (2013.01); *C08J 3/226* (2013.01); *C08J 3/241* (2013.01); *C08K 9/04* (2013.01); *C08J 2363/00* (2013.01); *C08J 2363/02* (2013.01); *C08J 2463/00* (2013.01); *C08J 2463/02* (2013.01)

(58) Field of Classification Search
CPC ....... C08G 59/4021; C08J 3/212; C08J 3/226; C08J 3/241; C08J 2363/00; C08J 2363/02; C08J 2463/00; C08J 2463/02; C08K 9/04
USPC ......................................................... 523/206
See application file for complete search history.

(56) References Cited

U.S. PATENT DOCUMENTS

| | | | | |
|---|---|---|---|---|
| 3,342,775 A | * | 9/1967 | Aelony | ...................... C08J 3/14 525/523 |
| 5,369,192 A | * | 11/1994 | Ko | ........................ C08G 59/226 525/482 |
| 7,226,976 B2 | * | 6/2007 | Koto | ...................... C08G 59/18 525/107 |
| 8,937,114 B2 | * | 1/2015 | Metral | .................... C08L 63/00 523/400 |
| 2005/0261398 A1 | | 11/2005 | Koeniger et al. | |
| 2010/0130655 A1 | * | 5/2010 | Agarwal | .............. C08G 59/182 524/145 |

FOREIGN PATENT DOCUMENTS

| | | |
|---|---|---|
| GB | 2265374 A | 9/1993 |
| WO | 2011/068645 A1 | 6/2011 |

OTHER PUBLICATIONS

International Search Report (ISR) issued in the parent Patent Cooperation Treaty (PCT), Application No. PCT/EP2017/062781, dated Aug. 25, 2017.

* cited by examiner

*Primary Examiner* — Hannah J Pak
(74) *Attorney, Agent, or Firm* — W. Mark Bielawski; David J. Oldenkamp

(57) ABSTRACT

The invention relates to a particulate curing component for a thermosetting resin, the particulate curing component comprising particles of a solid resin, wherein a curative for the thermosetting resin is dispersed within the particles of solid resin. The invention also relates to methods of forming particulate curing components and compositions comprising particulate curing components.

2 Claims, 3 Drawing Sheets

PARTICULATE CURING COMPONENTS

INTRODUCTION

The present invention relates to additives for curable resin compositions, particularly particulate curing components that can extend the outlife of curable resin compositions in which they are present without significantly affecting the curing properties of the compositions at elevated temperatures or significantly affecting the properties of the compositions once cured. The invention also relates to methods of preparing the particulate curing components, curable resin compositions comprising the particulate curing components, prepregs and semipregs comprising such curable resin compositions, and methods of forming cured composite materials from such curable resin compositions.

BACKGROUND

Composite laminar structures are strong and light-weight. Their use is well known and they are frequently used in automotive, aerospace, sporting goods and marine applications.

Typically composite materials are manufactured by stacking layers of a fibrous reinforcement material which is preimpregnated with a curable resin material (prepreg). The resin material is then cured by heating the stack whilst it is being compressed. This causes the resin to flow to consolidate the fibrous stack, and then to subsequently cure. This results in an integral laminar composite structure.

Composite materials can also be formed by arranging layers of dry fibrous material into a mould and then infusing with a curable resin. The resin wets out the fibres of the dry material before being cured. This process is known as resin transfer moulding (RTM).

Both methods result in a composite material with a laminar structure having a series of layers of impregnated fibrous reinforcement.

Both methods rely on the use of curable resin materials, i.e. polymeric materials that can be cured to form an interpolymer network by the addition of energy, particularly by heating. The cure cycles employed for curing components comprising curable resins are a balance of temperature and time, taking into account the reactivity of the resin. From an economic point of view it is desirable that the cycle time is as short as possible. In many cases it is also preferable for curing to take place at relatively low temperatures, such as 80° C., or even lower. As well as requiring heat to initiate curing of the resin the curing reaction itself can be highly exothermic and this needs to be taken into account in the time/temperature curing cycle. It is important to balance the needs for short moulding cycles employing reactive resins and controlling the exotherm to avoid damage to the resin and/or the mould. Curing agents (sometimes referred to as "curatives") are therefore often used in order to activate and control the curing of resins to provide the required cure cycle, the exotherm of the cure and the properties of the final cured resin, and/or to reduce the temperature at which curing can be carried out. A wide range of curing agents for resins have been proposed and are widely used.

The outlife of a resin is the duration for which the resin can be stored without it cross linking to a point where it is no longer useable. The desire for a short cure cycle and/or relatively low temperature curing must also be balanced with the outlife of the resin. The cure cycle and/or effective curing temperature can be reduced by adding more curing agents and/or curing accelerators; however this compromises the outlife of the resin. This problem is sometimes addressed by storing and transporting the curative and the resin separately, and mixing them only shortly before curing, but this introduces additional processing steps, and may also lead to poor curing due to inefficient mixing of the curative in the resin.

Various attempts have therefore been made to incorporate curatives in rein compositions, but to restrict the interaction of the curative and the resin under normal storage conditions. One such approach is to store resins containing curatives, or products comprising such resins, at reduced temperature, however this leads to difficulties in storing, transporting and handling the resins and resin infused products. Alternative approaches include modifying the curative so that it is not capable of interacting with the resin under normal storage conditions, or so that the rate of curing is reduced under normal storage conditions, for example by encapsulating or coating the curative to reduce interaction with the resin. However, the production of fully coated or encapsulated curatives may be difficult, and if the coating or encapsulation is not complete, or if it becomes damaged after formation, the curative may be rapidly released, leading to unpredictable curing of the resin. The materials used to form the coating or encapsulation may also adversely affect the properties of the cured resin.

EP0672707 is directed to microencapsulated curing agents for thermosetting resin compositions in which a curing agent for a thermosetting resin is microencapsulated in a thermoplastic resin dissolvable in the thermosetting resin. However, the process by which the curing agent is microencapsulated is complex, and the curing agent may be released unpredictably if the microencapsulation is not complete and/or if the microencapsulation coating becomes damaged after formation. Additionally, the thermoplastic resin and/or other components required to form the microencapsulation coating may adversely affect the properties of the thermosetting resin during or after curing.

SUMMARY OF THE INVENTION

The present invention aims to obviate or at least mitigate the above described problems and/or to provide advantages generally.

According to the present invention there is provided a particulate curing component for a thermosetting resin, a method of preparing a particulate curing component, a curable resin composition a prepreg or semipreg and a method of forming a cured composite material as defined in any of the accompanying claims.

In a first aspect, the present invention provides a particulate curing component for a thermosetting resin, the particulate curing component comprising particles of a solid resin, wherein a curative for the thermosetting resin is dispersed within the particles of solid resin.

In a second aspect, the present invention provides a method of preparing a particulate curing component according to the present invention comprising forming a solution of the solid resin, dispersing, dissolving or co-dissolving the curative in the solution of the solid resin, causing the solid resin to solidify and, if necessary, forming particles from the solidified product.

In a third aspect, the present invention provides a particulate curing component obtainable by the methods of the present invention.

In a fourth aspect, the present invention provides a curable resin composition comprising a thermosetting resin and a particulate curing component according to the present invention, wherein the curative dispersed in the particles of solid resin is suitable for curing the thermosetting resin.

In a fifth aspect, the present invention provides a prepreg or semipreg comprising reinforcing fibres and a curable resin composition according to the present invention.

In a sixth aspect, the present invention provides a method of forming a cured composite material, comprising infusing reinforcement fibres with a resin composition according to the present invention and heating the infused fibres to a temperature sufficient to soften the solid particles so as to release the curative, and, optionally, further heating to cause the curative to cure the thermosetting resin.

SPECIFIC DESCRIPTION

The particulate curing components of the present invention comprise particles of a solid resin having a curative for a thermosetting resin dispersed within the particles of solid resin. By dispersed within the particles, it is meant that the curative is distributed substantially evenly throughout the matrix of the solid resin particles, and in particular it is meant that the particles do not comprise specific regions of relatively high or low concentrations of the curative. For example, the particles are not in the form of structured microcapsules and do not comprise specific coating layers. Thus, a portion of the curative will be present at the surface of the particles, but the majority of the curative will be held within the interior of the particles. Furthermore, because the particles are formed from a solid resin, the curative will be held within the particles, and will not be free to diffuse out from the particles, or will do so only very slowly under normal conditions. Thus, the majority of the curative will not be free to interact with materials surrounding the particles. Furthermore, the proportion of the curative present at the surface of the particles will generally be too low to initiate full curing of a thermosetting resin. Therefore, when the particulate curing component of the invention is mixed with a thermosetting resin of a type that may suitably be cured using the curative in the particles, the curing effect will be minimised, or even totally suppressed, whilst the mixed thermosetting resin and particulate curative component are held at temperatures at which the solid resin remains solid. Thus, the particulate curing components of the present invention may be used to extend the outlife of thermosetting resin compositions and/or to increase the temperature at which such compositions may be stored. For example, by using particulate curing compositions of the present invention, the outlife of a thermosetting resin composition may be increased by 6 weeks or more at 30° C. compared to a thermosetting resin composition comprising the same curative that has not been dispersed in a solid resin.

The solid resins used to form the particulate curing components of the present invention may be any resins that are solid at ambient conditions, preferably resins that are solid at 20° C. Suitable resins should also melt or become sufficiently permeable to allow the curative to diffuse under certain conditions so that the curative may cause a thermosetting resin in which the particles are mixed to cure. Preferably therefore, the solid resin melts or becomes sufficiently permeable to allow the resin to diffuse at temperatures at or below the temperature at which curing of a thermosetting resin in which the particles are mixed is intended to take place. This intended temperature will depend on a number of factors, including the nature of the thermosetting resin, the nature of the curative and the desired properties of the cured thermosetting resin, but one skilled in the art will be able to identify preferred curing temperatures for most combinations of curative and thermosetting resin relatively easily. Additionally, in order to prevent or reduce the possibility of premature curing, the solid resin will preferably not melt or become sufficiently permeable to allow the curative to diffuse until the temperature is relatively close to the intended curing temperature, for example within 20° C. or less of the intended curing temperature, preferably within 10° C. or less.

The temperature at which a given solid resin melts may be easily determined using conventional methods. Similarly, the temperature at which particles of a given solid resin become sufficiently permeable to allow a given curative dispersed within the particles may also be easily determined, for example by heating the particles and determining the temperature at which the curative becomes detectable in the surrounding medium, either directly (for example by spectroscopy) or indirectly (for example by noting the effect of the curative on a surrounding curable resin).

In a preferred embodiment, the solid resin melts or becomes sufficiently permeable to allow the curative to diffuse at a temperature of 30° C. or greater, preferably at a temperature of from 30° C. to 150° C., more preferably from 30° C. to 100° C., most preferably from 40° C. to 80° C.

Any resins that are solid at ambient conditions and in which a curative for a thermosetting resin may be dispersed, but that will melt or soften sufficiently to allow the curative to disperse under suitable conditions may be used to form the particulate curing components of the present invention. However, preferably the solid resins are selected so that they will not adversely affect the properties of a thermosetting resin into which they are mixed either during or after curing of the thermosetting resin. The particles of solid resin may be formed from a single resin or mixtures of two or more different solid resins. Preferably the particles of solid resin are formed from uncured or only partially cured resin.

In preferred embodiments of the present invention, the solid resin is a phenoxy resin or an epoxidised resin, preferably an epoxy resin. Epoxy resins are organic materials having an average of at least 1.5, generally at least 2, reactive 1,2-epoxy groups per molecule. These epoxy resins can have an average of up to 6, preferably up to 4, most preferably up to 3, reactive 1,2-epoxy groups per molecule. These epoxy resins can be monomeric or polymeric, saturated or unsaturated, aliphatic, cyclo-aliphatic, aromatic or heterocyclic and may be substituted, if desired, with other substituents in addition to the epoxy groups, e.g. hydroxyl groups, alkoxyl groups or halogen atoms.

Suitable examples include epoxy resins from the reaction of polyphenols and epihalohydrins, poly alcohols and epihalohydrins, amines and epihalohydrins, sulfur-containing compounds and epihalohydrins, polycarboxylic acids and epihalohydrins, polyisocyanates and 2,3-epoxy-1-propanol (glycidyl) and from epoxidation of olefinically unsaturated compounds.

Preferred epoxy resins are the reaction products of polyphenols and epihalohydrins, of polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins. Illustrative examples of epoxy resins useful herein are described in The Handbook of Epoxy Resins by H. Lee and K. Neville, published in 1967 by McGraw-Hill, New York, in appendix 4-1, pages 4-56, which is incorporated herein by reference.

The epoxy resin may comprise an average epoxy equivalent weight (EEW) in the range of from 40 to 4000, preferably from 40 to 3500. The average EEW is the average molecular weight of the resin divided by the number of epoxy groups per molecule. The molecular weight is a weight average molecular weight.

For difunctional epoxy resins the average epoxy equivalent weight is advantageously from about 170 up to about 3000, preferably from about 170 up to about 1500.

Examples of suitable epoxy resins having an average epoxy equivalent weight of from about 50 to about 500 include resins that are commercially available from The Dow Chemical Company, such as D.E.R. 330, D.E.R. 331 and D.E.R. 332 epoxy resins. Examples of epoxy resins with higher epoxide equivalent weight include D.E.R. 667, D.E.R. 669 and D.E.R. 732, all of which are commercially available from The Dow Chemical Company, and Araldite GT6071, GT7071, GT7004, GT7072 and GT6099, all of which are available from Huntsman Advanced Materials.

Another class of polymeric epoxy resins which are useful for the purpose of the present disclosure includes the epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K.; Handbook of Epoxy Resins, McGraw Hill Book Co. New York, 1967, the teaching of which is included herein by reference. Other useful epoxy novolac resins include those commercially available from The Dow Chemical Company as D.E.N. 431, D.E.N. 438 and D.E.N. 439 resins, respectively.

Other classes of resins of use in the present invention include solid phenol novolac resins, such as EPN1179, available from Huntsman Advanced Materials; epoxy cresol novolac resins, such as ECN 1273, ECN 1280, ECN 1299 and ECN 9699, all of which are available from Huntsman Advanced Materials; and CTBAN-epoxy resin adducts.

The particulate curing components of the present invention may comprise any curatives capable of curing a thermosetting resin, but preferably the curatives have relatively low reactivity to prevent or reduce premature curing caused by the small amounts of curative present on the surface of the particles of solid resin. Preferably the curatives are solid at ambient conditions, such as at 20° C.

In preferred embodiments of the present invention the curatives are urea based curatives or imidazole curatives.

The urea based curatives may comprise a bis urea curing agent, such as 2,4 toluene bis dimethyl urea or 2,6 toluene bis dimethyl urea and/or combinations of the aforesaid curing agents. Urea based curing agents may also be referred to as "urones".

Other suitable urea based curatives may comprise:

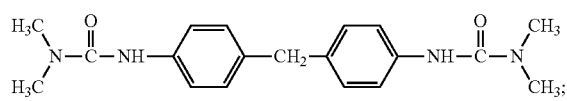

4,4-methylene diphenylene bis(N,N-dimethyl urea), or the 2,4' and 2,2' isomers thereof

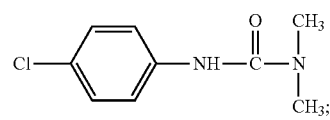

1,1-dimethyl, 3-(4-chlorophenyl)urea

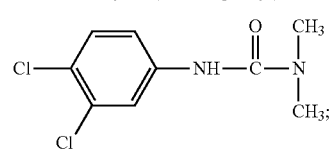

1,1-dimethyl, 3-(3,4-dichlorophenyl)urea

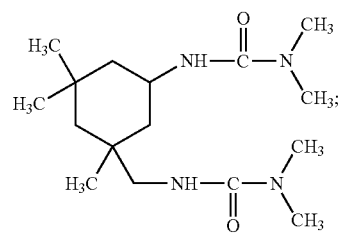

Isophorone bisdimethyl urea

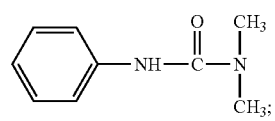

1,1-dimethyl, 3-phenyl urea

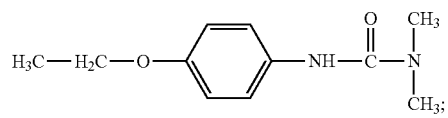

1,1-dimethyl, 3-(4-ethoxyphenyl)urea

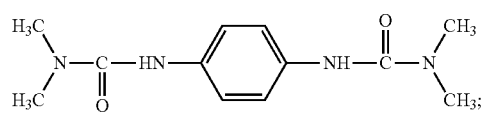

1,1-(4-phenylene)-bis(3,3-dimethyl)urea

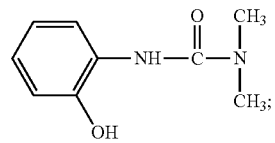

1,1-dimethyl, 3-(2-hydroxyphenyl)urea

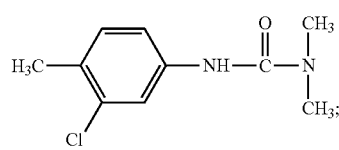

1,1-dimethyl, 3-(3-chloro-4-methylphenyl)urea

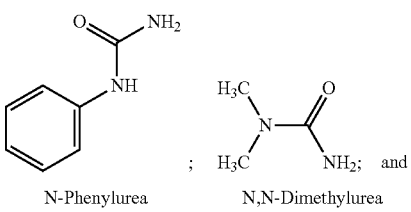

N-Phenylurea          N,N-Dimethylurea

-continued

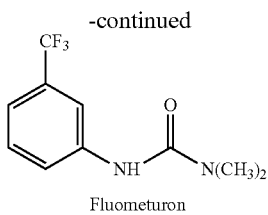

Fluometuron

Particularly preferred urea based curatives are the range of materials available under the commercial name DYHARD®, the trademark of Alzchem, or Isoqure®, the trademark of Isochem Kautschuk GmbH, or Omicure™, the trademark of CVC Emerald Performance Materials, or urea derivatives which include bis ureas such as UR500 and UR505.

Preferably the particulate curing components of the present invention comprise sufficient curative to cure the thermosetting resin into which they are to be mixed once the curative is released from the particles of solid resin, but not enough to cure the thermosetting resin during normal storage. In preferred embodiments of the present invention the curative is present in the particles of solid resin at concentrations of from 10 to 90 wt %, preferably from 20 to 50 wt %, more preferably from 20 to 30 wt %.

The particulate curing components of the present invention may comprise one or more additional components, which may either be mixed with the particles of solid resin or, preferably, dispersed in the particles of solid resin. Such additional components may contribute to the properties of a thermosetting resin cured by the particulate curing components, but should not adversely affect the properties of the cured thermosetting resin and, in particular, should not cause curing of the thermosetting resin under normal storage conditions. Preferred additional components may be selected from fillers, tougheners, rubber adducts, viscosity modifiers, precipitated/pyrogenic silica, co-catalysts and/or co-accelerators, although, as noted, any co-catalysts or co-accelerators included in the particulate curing components should not cause curing of any thermosetting resin into which the particulate curing components are mixed under normal storage conditions.

The particulate curing components of the present invention preferably comprise particles of a size suitable for convenient mixing into a liquid or semi-solid thermosetting resin and to not adversely affect the use of the thermosetting resin in application to reinforcing fibres, for example to form a prepreg or by infusion. In preferred embodiments of the present invention the particles of solid resin have a $D_{90}$ of 100 μm and a $D_{10}$ of 2 μm, i.e. at least 90% of the particles will pass through a 100 μm sieve but no more than 10% will pass through a 2 μm sieve, or at least 80% of the particles have a particle size of between 100 μm and 2 μm.

The particulate curing components of the present invention may be prepared in any conventional manner, but preferably the method of preparation should not cause the solid resin to cure or should cause only partial curing of the solid resin. Thus, in a second aspect, the present invention provides a method of preparing a particulate curing component according to the present invention comprising forming a solution of the solid resin, dispersing, dissolving or co-dissolving the curative in the solution of the solid resin, causing the solid resin to solidify and, if necessary, forming particles from the solidified product. Preferably the process is carried out without heating the mixture of solid resin and curative sufficiently to cause the solid resin to cure, or at least to not become fully cured.

In preferred embodiments of the methods of present invention, the solution of the solid resin is formed by dissolving the solid resin in a suitable solvent and, following dispersion, dissolving or co-dissolving of the curative in the solution of the solid resin, caused the solid resin to solidify by removing the solvent.

Any suitable solvent may be used in the process of the present invention, but preferred solvents are organic solvents, particularly organic solvents having boiling points below 100° C. Particularly preferred solvents include methyl-ethyl-ketone, acetone, dichloromethane, methanol and ethanol.

The curative may be dispersed, dissolved or co-dissolved in the solution of the solid resin by any convenient means, such as by stirring, but preferably without heating.

Following dispersion, dissolving or co-dissolving of the curative in the solution of the solid resin the solvent may be removed in any convenient manner, but preferably the method used should be adapted to maintain substantially even distribution of the curative in the solidified product. Particularly suitable methods include the use of a rotary evaporator or spray drier, and/or drying, preferably under a vacuum and/or in a desiccator; and in particularly preferred embodiments, the solution of solid resin is agitated, such as by stirring, during solvent removal to maintain a substantially even distribution of the curative.

In some cases, particles of a suitable size may be formed inherently by the method of solvent removal, but in other cases it may be necessary to form suitable particles from the solidified product. This may be done in any convenient way, such as by sieving, grinding, milling and/or micronisation. Preferably the process of forming particles from the solidified product does not cause curing of the solid resin.

The particulate curing components of the present invention are particularly suitable for use in curable thermosetting resin compositions, particularly curable resin compositions having improved outlife.

In a further aspect therefore, the present invention provides a curable resin composition comprising a thermosetting resin and a particulate curing component according to the present invention, wherein the curative dispersed in the particles of solid resin is suitable for curing the thermosetting resin. By suitable for curing the thermosetting resin, it is meant that the curative will cause the thermosetting resin to cure under suitable conditions when the curative is released from the particles of solid resin. However, because the curative is dispersed within particles of solid resin, it will not cause curing of the thermosetting resin under normal storage conditions, or at least the rate of curing will be significantly reduced compared to the rate of curing caused by the same curative when it is not dispersed in particles of solid resin.

The curable resin compositions of the present invention are particularly suitable for forming prepregs or semipregs or for use in resin infusion systems such as resin transfer moulding, and therefore the thermosetting resins are preferably liquid or semi-solid at ambient conditions, such as at 20° C.

In preferred embodiments of the compositions of the present invention, the thermosetting resin is a phenoxy resin or an epoxidised resin, preferably an epoxy resin. The thermosetting resin may also comprise mixtures of different thermosetting resins.

Any of the general types of epoxy resins suitable for use as solid resins in the particulate curing components of the present invention may also be suitable for use as a thermosetting resin in the compositions of the present invention, if available in liquid or semisolid form. Particularly suitable thermosetting resins include bisphenol-diglycidyl ether epoxy resins, phenol novolac resins, epoxy cresol novolac resins, CTBAN-epoxy resin adducts, or blends thereof, particularly liquid or semi-solid bisphenol A diglycidyl ethers, such as LY1556, LY1589, MY0510 or GY250, all available from Huntsman Advanced Materials, or YD-136, available from KUKDO Chemicals.

In preferred embodiments of the compositions of the present invention the thermosetting resin has a minimum curing temperature of 50° C. to 150° C., preferably from 60° C. to 120° C., more preferably from 70° C. to 100° C. In the present application the minimum curing temperature is defined as the temperature at which significant curing of the resin begins, i.e. the lowest temperature to which the resin would usually be heated in order to carry out full curing of the resin. This temperature will depend to at least some extent on the nature of the curative and its concentration, and may also depend on other factors, including the rate of heating, however one skilled in the art will generally be able to readily determine the minimum curing temperature for a given combination of thermosetting resin and curative.

The compositions of the present invention may comprise additional components including all conventional thermosetting resin composition components, but preferably not components that will cause premature curing of the composition under normal stage conditions. Preferably the compositions of the present invention comprise one or more additional components selected from fillers, tougheners, rubber adducts, viscosity modifiers, B-stagers, curing agents and/or curing accelerators, but preferably not sufficient additional curing agents and/or accelerators to cause premature curing of the compositions under normal storage conditions.

The amount of the particulate curing component of the present invention included in a compositions of the present invention will depend upon the nature of both the curative and the thermosetting resin, as well as the concentration of the curative in the particles of solid resin, the presence of additional curatives, if any, in the composition and the intended curing cycle; however, one skilled in the art will generally be readily able to determine suitable concentrations for a given combination of curative and thermosetting resin. In preferred embodiments of the compositions of the present invention, the concentration of the particulate curing composition is from 5 to 40 wt %, preferably from 10 to 30 wt %, based on the weight of the composition.

In certain embodiments of the compositions of the present invention, the curative contained in the particulate curing components of the present invention is not also present in the thermoforming resin other than dispersed within the particles of solid resin, but in alternative embodiments an additional amount of the curative contained in the particulate curing component may be present in the thermoforming resin, although not in a sufficient amount to cause premature curing of the resin during storage. In either case, the preferred total concentration of this curative in the compositions of the present invention is from 0.1 to 20 wt %, more preferably from 0.5 to 10 wt %, based on the weight of the composition.

The compositions of the present invention preferably have an extended outlife and/or may be stored at higher temperatures than compositions comprising the same thermosetting resin and curative but in which the curative is not dispersed in a solid resin. In particular embodiments of the present invention, the compositions of the present invention have an outlife at 30° C. of at least 6 weeks, preferably at least 3 months.

The curable resin compositions of the present invention are particularly suitable for forming prepregs or semipregs or for use in resin infusion systems such as resin transfer moulding, and therefore the present invention provides a prepreg or semipreg comprising reinforcing fibres and a curable resin composition according to the present invention.

The prepregs and semipregs of the present invention may be formed in any convenient manner using the compositions of the present invention. The reinforcement fibres used in the prepregs and semipregs of the invention may be selected from hybrid or mixed fibre systems that comprise synthetic or natural fibres, or a combination thereof. The fibrous reinforcement may preferably be selected from any suitable material such as fiberglass, carbon or aramid (aromatic polyamide) fibres. The fibrous reinforcement is preferably carbon fibre.

The fibrous reinforcement may comprise cracked (i.e. stretch-broken) or selectively discontinuous fibres, or continuous fibres. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fibre orientations. Such styles and forms are well known in the composite reinforcement field, and are commercially available from a number of companies, including Hexcel Reinforcements (Les Avenieres, France).

The present invention further provides a particulate curing agent according to the invention, wherein the particles of solid resin comprises one or more additional component, preferably wherein the additional component is selected from fillers, tougheners, rubber adducts, viscosity modifiers, precipitated/pyrogenic silica, co-catalysts and/or co-accelerators.

The present invention further provides a method of the invention, wherein the solvent is removed by evaporation, preferably in a rotary evaporator or a spray drier, and/or by drying, preferably in a vacuum and/or in a desiccator; and a method of the invention, wherein the solidified product is formed into particles by sieving, grinding, milling and/or micronisation.

The present invention further provides a particulate curing component obtainable by the method of the present invention.

The present invention further provides a composition according to the invention further comprising one or more additional components, preferably wherein the one or more additional components is selected from fillers, tougheners, rubber adducts, viscosity modifiers, B-stagers, curing agents and/or curing accelerators.

The present invention further provides a prepreg or semipreg comprising reinforcing fibres and a curable resin composition according to the present invention.

The present invention also provides a method of forming a cured composite material, comprising infusing reinforcement fibres with a resin composition according to the present invention and heating the infused fibres to a temperature sufficient to soften the solid particles so as to release the curative, and, optionally, further heating to cause the curative to cure the thermosetting resin. The infusing and curing steps may be carried out in any conventional manner, and preferred reinforcement fibres include any of the fibres that may be used to form the prepregs or semipregs of the invention, as listed above.

EXAMPLES

Embodiments of the inventions will now be described by way of example only and with reference to the following Examples and Figures, in which.

EXAMPLE 1

10 g of a solid bisphenol A diglycidyl ether (GT7071, available from Huntsman Advanced Materials) was dissolved in 20 ml acetone, and 2.5 g of a urea based curative (Dyhard UR500, available from Alzchem) was then mixed in. The acetone was evaporated using a rotary evaporator to leave a solid residue comprising 20 wt % UR500. This solid residue was further dried at room temperature and then passed through a 90 μm sieve to yield the curative dispersed in particles of a solid resin in the form of a powder. This powder was then mixed into a 20:80 w/w blend of a liquid bisphenol A diglycidyl ether (LY1556, available from Huntsman Advanced Materials) and a semisolid bisphenol A diglycidyl ether (YD-136, available from KUKDO Chemicals) at a concentration of 15 wt %, such that the urone was present in the final composition at a concentration of 3% w/w.

Figure 1:
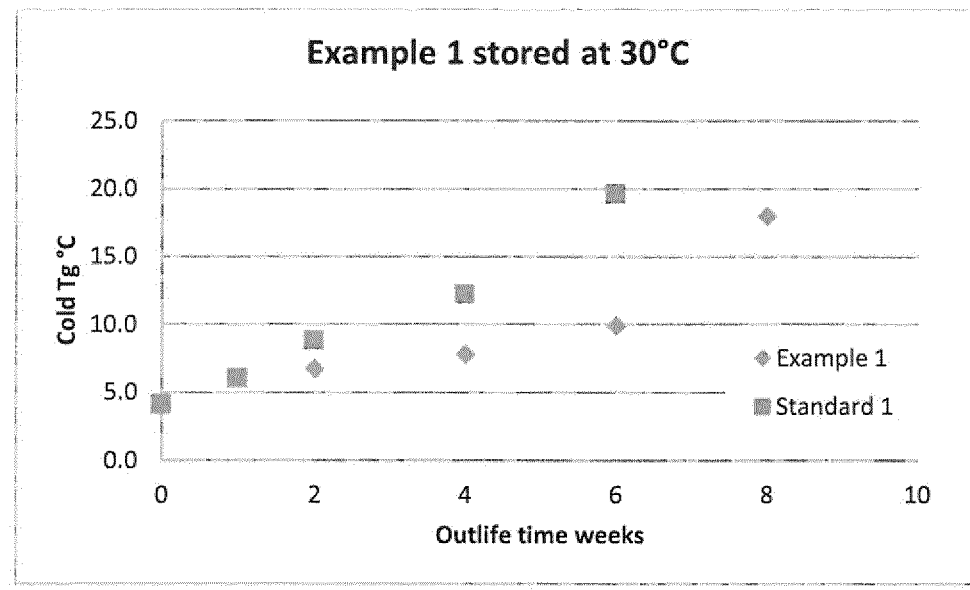
FIG. 1 is a graph comparing the aging over 8 weeks (expressed as cold Tg) of an example of a composition of the invention compared to a standard resin composition.

The composition was stored at 30° C. for 8 weeks, and the cold Tg was measured at various intervals by Differential Scanning calorimetry (DSC) using a TA Instruments DSC Q100 and MT DSC 1 in order to determine the aging/outlife of the composition. This was compared to a standard resin (Standard 1) comprising a blend of liquid and semisolid bisphenol A type epoxy resins and neat UR500 curative in mixing ratios and concentrations equivalent to those used in Example 1. The results are shown in FIG. 1, which shows that the material of Example 1 had reduced aging over a 6 week period at 30° C.

A sample of the composition of Example 1 was taken after 4 weeks and was cured for 6 hours at 80° C., and found to have a cured Tg, measured by Dynamic Mechanical Analysis (DMA) of 91° C., demonstrating acceptable cure.

EXAMPLE 2

The curative powder prepared in Example 1 was mixed into a liquid bisphenol A diglycidyl ether (LY1556, available from Huntsman Advanced Materials) in the presence of less than 10 wt % isophorone diamine (IPDA), available from BASF, which acted as a room temperature B-stager to increase the overall molecular weight and uncured Tg of the main epoxy component of the formulation.

Figure 2:
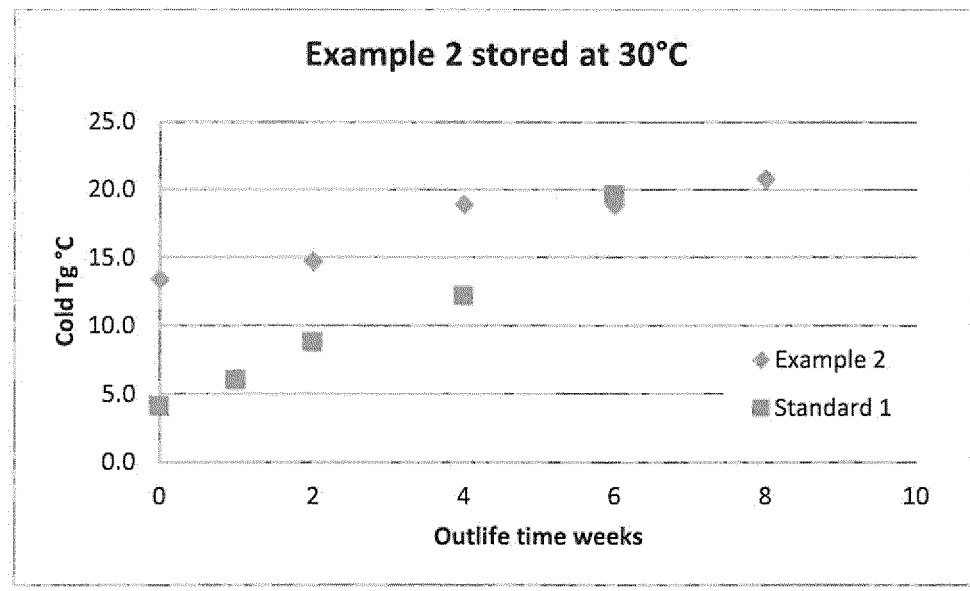
FIG. 2 is a comparing the aging over 8 weeks (expressed as cold Tg) of a further example of a composition of the invention compared to the standard resin composition.

The formulation of Example 2 was stored at 30° C. for 8 weeks and the uncured Tg was measured at various intervals by DSC, as described for Example 1, to determine the aging/outlife of the composition compared to the standard resin (Standard 1) also described in Example 1. The results are shown in FIG. 2, which shows that although the material of Example 2 starts at a higher cold Tg at day 0 due to the amount of IPDA added (this could be tailored to better match the starting cold Tg of Standard 1), the change in cold Tg over the storage period was substantially smaller than that of Standard 1, indicating a reduced rate of aging of the liquid resin composition.

A sample of the composition of Example 2 was taken after 4 weeks and was cured for 6 hours at 80° C., and was found to have a cured Tg of 89° C., demonstrating acceptable cure.

EXAMPLE 3

16 g of a solid bisphenol A diglycidyl ether (GT6099, available from Huntsman Advanced Materials) was dissolved in 400 ml methyl-ethyl-ketone, and 4 g of a urea based curative (Dyhard UR500, available from Alzchem) was then mixed in. The solvent was evaporated using a rotary evaporator to leave a solid residue. This solid residue was further dried in a vacuum oven and then passed through a 90 μm sieve to yield the curative dispersed in particles of a solid resin in the form of a powder comprising 20 wt % UR500. This powder was then mixed into a 30:70 w/w blend of a liquid bisphenol A diglycidyl ether (LY1556, available from Huntsman Advanced Materials) and a semisolid bisphenol A diglycidyl ether (YD-136, available from KUKDO Chemicals) at a concentration of 15 wt %, such that the urone was present in the final composition at a concentration of 3% w/w.

EXAMPLE 4

24 g of a solid bisphenol A diglycidyl ether (GT6099, available from Huntsman Advanced Materials) was dissolved in 400 ml methyl-ethyl-ketone, and 4 g of a urea based curative (Dyhard UR500, available from Alzchem) was then mixed in. The solvent was evaporated using a rotary evaporator to leave a solid residue. This solid residue was further dried in a vacuum oven and then passed through a 90 μm sieve to yield the curative dispersed in particles of a solid resin in the form of a powder comprising 14.3 wt % UR500. This powder was then mixed into a 30:70 w/w blend of a liquid bisphenol A diglycidyl ether (LY1556, available from Huntsman Advanced Materials) and a semisolid bisphenol A diglycidyl ether (YD-136, available from KUKDO Chemicals) at a concentration of 21 wt %, such that the urone was present in the final composition at a concentration of 3% w/w.

The compositions of Example 3 and Example 4 were stored at 30° C. for 40 days, and the cold Tg was measured at various intervals by Differential Scanning calorimetry (DSC) using a TA Instruments DSC Q100 and MT DSC 1 in order to determine the aging/outlife of the compositions. This was compared to a standard resin (Standard 1, as described in Example 1). The results are shown in FIGS. 3 and 4, which show that the materials of Examples 3 and 4 had a smaller increase in cold Tg over a 6 week period at 30° C. compared to the material of Standard 1, indicating a reduced rate of aging.

Figure 3:
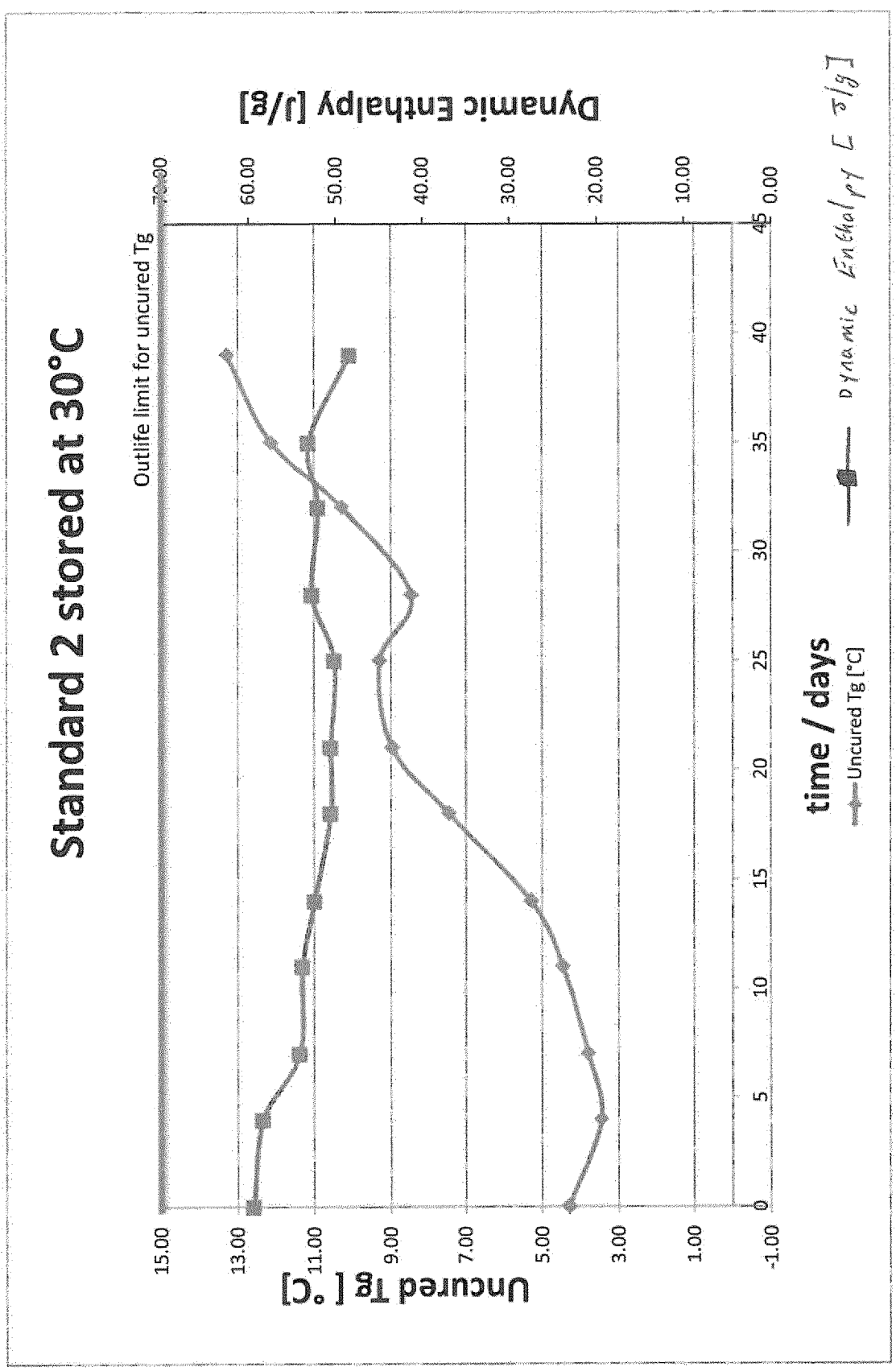
FIG. 3 is a graph showing the outlife (expressed as cold Tg) and dynamic enthalpy of a standard resin over 40 days.
Figure 4:
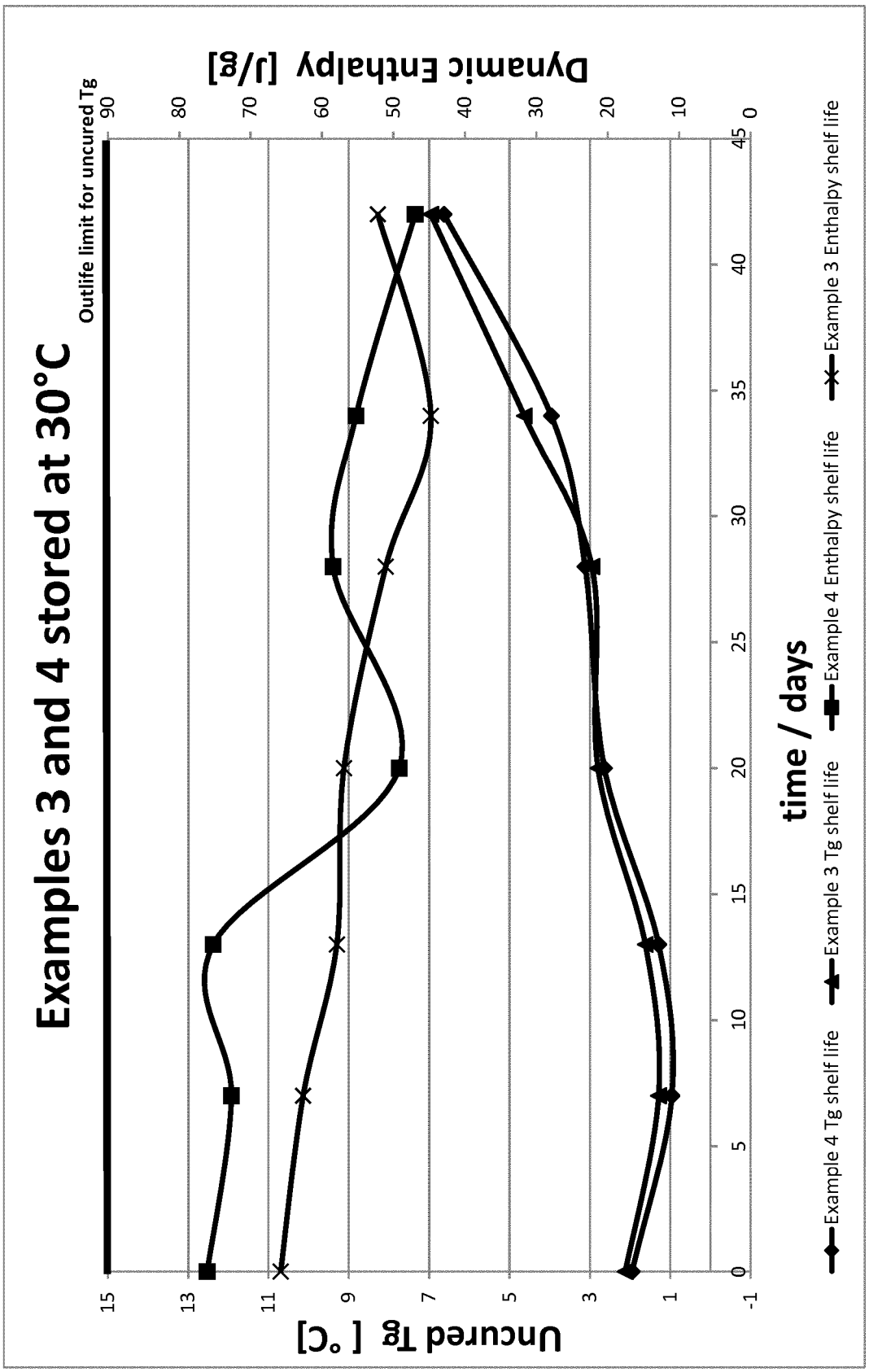
FIG. 4 is a graph showing the outlife (expressed as cold Tg) and dynamic enthalpy of two further examples of compositions of the invention over 40 days.

Dynamic exotherm measurements were also made at various intervals for both the materials of Examples 3 and 4 and Standard 1 by DSC, and the results are also shown in FIGS. 3 and 4. These show that the dynamic enthalpy values remained generally similar during storage, suggesting that the curing ability of the materials of Examples 3 and 4 was generally unaffected.

The invention claimed is:

1. A particulate curing component for a thermosetting resin, the particulate curing component comprising particles of a solid resin, wherein a curative for the thermosetting resin is dispersed within the particles of solid resin;
   wherein said solid resin melts at a temperature of 40° C. to 80° C.;
   wherein said solid resin is a bisphenol-diglycidylether epoxy resin;
   wherein said curative is solid at 20° C.;
   wherein said curative is an isomer of N,N"-(methyl-m-phenylene)bis(N,N'-dimethylurea);
   wherein said curative is present in the particles of solid resin at a concentration of from 20 to 30 wt %; and
   wherein the particles of said solid resin have a $D_{90}$ of 100 μm and a $D_{10}$ of 2 μm.

2. A curable resin composition comprising a thermosetting resin and the particulate curing component defined in claim 1, wherein the thermosetting resin is a liquid or semi-solid at 20° C. and has a minimum curing temperature of from 70° C. to 100° C.; and wherein said composition has an outlife at 30° C. for at least 3 months.

* * * * *